Dec. 29, 1953  G. E. BEARD  2,664,040
ROTARY EARTH TILLING DEVICE
Filed Oct. 24, 1950  2 Sheets-Sheet 1
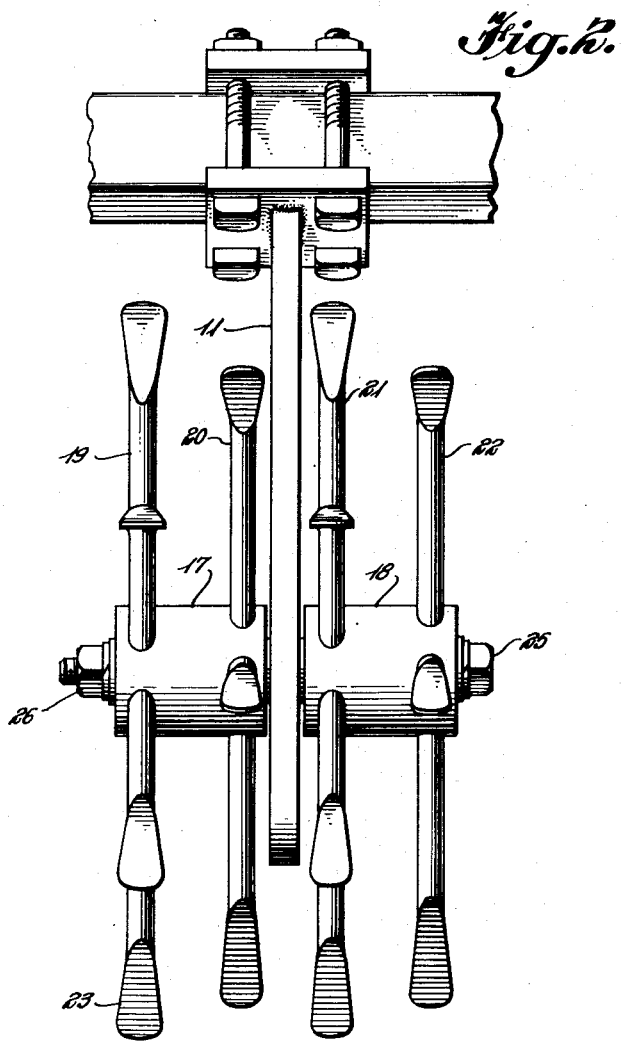
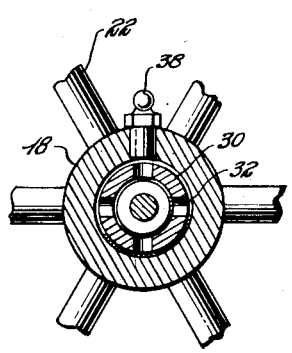
INVENTOR
George E. Beard
BY
ATTORNEYS Dec. 29, 1953  G. E. BEARD  2,664,040
ROTARY EARTH TILLING DEVICE
Filed Oct. 24, 1950  2 Sheets-Sheet 2

INVENTOR
George E. Beard
BY Burns Doane + Benedict
ATTORNEYS

Patented Dec. 29, 1953

2,664,040

UNITED STATES PATENT OFFICE 2,664,040

ROTARY EARTH TILLING DEVICE

George E. Beard, San Angelo, Tex.

Application October 24, 1950, Serial No. 191,896

3 Claims. (Cl. 97—52)

The present invention relates to a rotary earth tilling device of universal applicability to various implements, and more particularly to power driven implements, and which is especially adapted to the preparation of seed beds and to the early cultivation of row crops.

It is among the purposes of the invention to provide a rotary earth tilling unit which may be employed in any desired multiples and with any predetermined desired spacing between the units, the rotary earth tilling unit of the present invention being susceptible of assembly and sale as an individual unit and comprised of readily replaceable elements which may be replaced or renewed with great facility.

It is a further object and purpose of the invention to provide a rotary earth tilling device which avoids packing or compressing of the earth and one which leaves the earth surface in the form of a loose mulch.

I am aware that various types of toothed rotary earth working implements have heretofore been proposed. However, none has embodied the simplicity of construction, the ready assembly and replacement of parts, and the efficacy of operation afforded by the device of the present invention as evidenced by its immediate commercial acceptance.

More specifically detailed advantages of the invention will become apparent as the description thereof proceeds which will be given in connection with the accompanying drawings forming a part hereof, and in which:

Figure 2 is a plan view of the rotary earth tilling unit of Figure 1;

Figure 4 is a fragmentary transverse sectional view taken along the line 4—4 of Figure 3.

Figure 1:
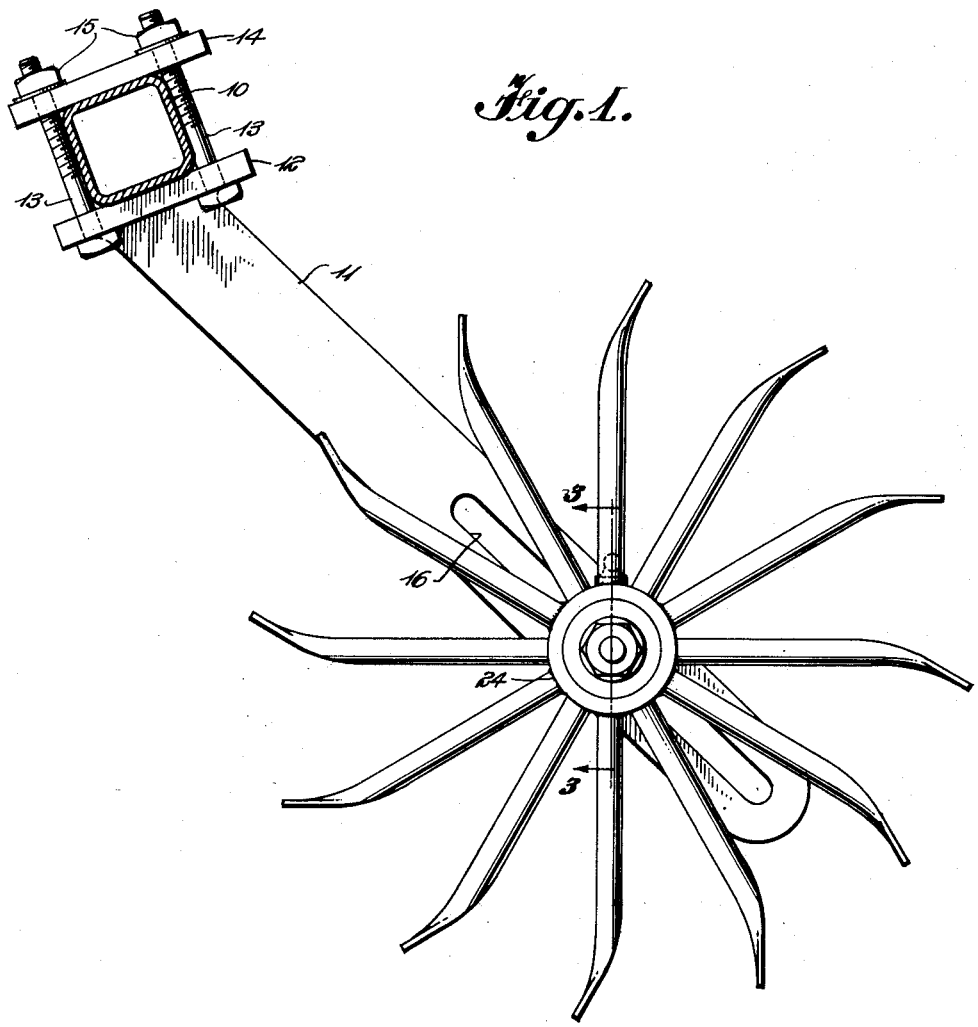
Figure 1 is a side elevational view of a rotary earth tilling device conforming to the invention, showing the supporting implement bar in cross section.

Referring to Figure 1, the numeral 10 designates a conventional implement supporting bar of the type carried or adapted to be mounted either in advance of or in rear of a tractor or to be carried on any form of earth working implement. The bar 10 forms no part of the present invention and merely constitutes an appropriate carrier for the rotary earth tilling unit which does constitute the invention.

The single rotary earth tilling unit embraces the elongated bar 11, integrally carrying at its upper end a plate 12 provided with appropriately spaced openings for receiving the clamping bolts 13, there being four such bolts illustrated in the preferred embodiment shown in the drawings. The plate 12 extends at an angle of about 30 degrees to the bar 11. A clamping plate 14 is provided with suitable apertures for the free ends of the bolts 13 and is adapted to be held in assembled position by the threaded nuts 15 received on the free ends of the bolts 13. It will be appreciated that the clamping plate 14 and the plate 12 may have any desired configuration suitable to the particular form of implement supporting bar on which the rotary tilling unit is to be mounted. Substantially square bars such as the one indicated at 10 are usually provided on earth working implements and for that reason the clamping means for the unit is illustrated as applicable to such a square bar.

The lower end of the bar 11 is provided with an elongated slot 16 extending longitudinally of the bar 11. The slot 16 permits the setting of the rotary elements of the unit at any desired position of adjustment along said slot.

The rotary earth tilling unit embraces two interchangeable rotary elements 17 and 18. Each of the rotary elements 17 and 18 is provided with two sets of axially spaced earth engaging teeth. The sets of earth engaging teeth on rotary element 17 are designated 19 and 20, and the separate sets of earth engaging teeth on the rotary element 18 are designated 21 and 22. In the preferred embodiment each of the sets of teeth 19, 20, 21 and 22 embraces six individual earth engaging teeth. The unit thus carries twenty-four individual earth engaging elements. Each tooth is a duplicate of every other tooth, and each tooth terminates at its free ends in a flattened curved portion 23. The shank of each tooth is preferably smooth and round and each tooth is integrally secured as by welds indicated at 24 to the hub of its associated rotary element 17 or 18. The rotary elements 17 and 18 are held in position on the bar 11 by the clamping bolt 25 carrying a threaded nut 26, the arrangement being such that the rotary element 17 lies on one side of the bar 11 and the rotary element 18 on the opposite side of the bar 11.

Figure 3:
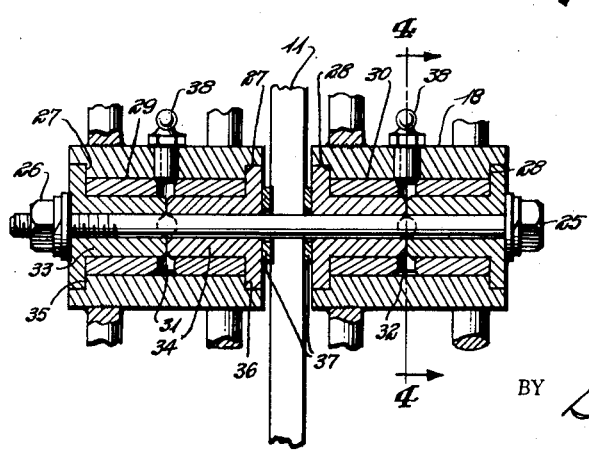
Figure 3 is a fragmentary sectional view through the bearing assembly taken along the line 3—3 of Figure 1.

By referring to Figure 3 it will be observed that the opposite ends of the hub of the rotary element 17 are provided with annular shoulders 27 and that the hub of the rotary element 18 is likewise provided at its opposite ends with annular shoulders 28. A floating sleeve 29 is received in the hub portion of the rotary element 17 and is of a length such that it terminates flush with the faces of the shoulders 27. An identical floating sleeve 30 is received in the hub of the rotary element 18 and is of a length such that its ends terminate flush with the shoulders 28. The sleeves 29 and 30 are provided with centrally located, radially extended apertures 31 and 32 to facilitate lubrication. A split bearing comprised of two parts 33 and 34 is received within the hub of the rotary element 17 and floating sleeve 29. The bearing member 33 has an annular flange 35 and the member 34 has an annular flange 36. The flanges 35 and 36 are adapted to abut the annular shoulders 27 in the hub of the rotary elment 17 with sufficient clearance to permit free relative rotation. The flanges 35 and 36 hold the floating sleeve 29 in place. It will additionally be observed that the inner ends of the members 33 and 34 are slightly beveled to provide a lubricant receiving groove in alignment with apertures 31 in the sleeve 29. The two part bearing received in the sleeve 30 of the rotary element 18 is an exact duplicate of the hereinabove described two part bearing member received in the sleeve 29 of rotary element 17 and needs no further detailed description. Spacing washers 37 are adapted to lie on either side of the bar 11 and appropriate lock washers are positioned at opposite ends of the bolt 25. The arrangement is such that the bolt 25 and the two sets of two part bearing members, exemplified by members 33 and 34 in the rotary element 17, are all tightly clamped to the bar 11 and together constitute the stationary bearing about which the rotary elements 17 and 18 turn. The interposed floating sleeves 29 and 30, receiving lubricant through the conventional zerk fittings 38, provide a fully protected floating mount for each of the rotating elements of the unit.

It will be observed that all corresponding elements are interchangeable. For example, the rotary elements 17 and 18 may be interposed; the floating sleeves 29 and 30 may be interposed; the two part bearing members 33 and 34 may be interposed within the rotating element 17 or they may be interchanged with either of the two part bearing members mounted in the sleeve 30. All elements may be fabricated as standard parts and any single element may be replaced without necessitating replacement of other parts. The single bolt 25 holds both rotating elements 17 and 18 in assembled relation and in appropriate position of adjustment on the bar 11. The ease of assembly and the ready replaceability of individual parts constitute meritorious features of the invention. The bearings are sealed and protected from leakage of grease and ingress of dirt.

It will be noted that the teeth of the two sets 19 and 20 and of the two sets 21 and 22 are welded to their associated hubs in staggered relation. Teeth of approximately six and one-half inches in length, either round or square in cross section, provided with flattened working ends have been found highly effective in use. The locating of the rotating elements 17 and 18 longitudinally of the arm 11 through the medium of the slot 16 permits ready adjustment to attain any desired depth of penetration of the earth by the teeth.

The implement has been found to be of very great value in the early stages of row crop tilling shortly after the plants have broken through the top of the ground, and in some instances where the plants have not yet come through the crust. The device is light in weight and does not pack the earth. It is effective in breaking the crust around the plants without injury thereto and can be used in conjunction with routine row crop tilling by positioning a pair of the exemplified units in a position to run close to the rows being plowed. The rotary elements of the units in such use provide fenders to prevent the midrow plows from covering the plants with dirt. The exemplified units can be mounted in spaced relation to cultivate row crops or, alternatively, can be mounted in juxta-position so as to provide a continuous action which can be employed most effectively in preparing seed beds and is even effective in aerating grass sod. The device has already received wide acceptance and demonstrated its efficiency under severe tests.

Having thus described my invention, what I claim is:

1. An earth tilling device comprising an elongated bar having a longitudinally extending slot therein, an axle extending through said slot, a rotary earth tilling unit on said axle on each side of said bar, each of said earth tilling units comprising a hub having an outwardly facing annular shoulder in each end thereof, bearing means in each end of said hub adjacent said shoulders, a spacer sleeve surrounding said axle within said hub between said bearing means, said spacer sleeve having an axial length substantially equal to the axial distance between said shoulders, and means on the ends of said axle engaging the outer bearing means of each tilling unit and applying inwardly directed forces to said outer bearing means and through said spacer sleeve to the inner bearing means of each tilling unit to force the inner bearing means of each tilling unit toward the sides of said bar, thereby causing said earth tilling units to be tightly clamped to said bar while preventing said bearing means from being forcibly urged against their associated shoulders.

2. An earth tilling device comprising an elongated bar having a longitudinally extending slot therein, an axle extending through said slot, a rotary earth tilling unit on said axle on each side of said bar, each of said earth tilling units comprising a hub having an outwardly facing annular shoulder in each end thereof, bearing means in each end of said hub adjacent said shoulders, a spacer sleeve surrounding said axle within said hub between said bearing means, said spacer sleeve having an axial length substantially equal to the axial distance between said shoulders, and means on the ends of said axle engaging the outer bearing means of each tilling unit and forcing the inner bearing means of each tilling unit toward the sides of said bar, such force being transmitted between the inner and outer bearing means of each tilling unit by the associated spacer sleeve thereby enabling said earth tilling units to be tightly clamped to said bar while preventing said bearing means from being forcibly urged against their associated shoulders.

3. An earth tilling device comprising an elongated bar having a slot therein, an axle bolt extending through said slot, a rotary earth tilling unit on said axle bolt on each side of said bar, each of said earth tilling units comprising a hub having an outwardly facing annular shoulder in each end thereof, bearing means surrounding said axle bolt in each end of said hub, said bearing means having peripheral portions positioned adjacent said shoulders, a spacer sleeve surrounding said axle within said hub between said bearing means, said spacer sleeve providing positive minimum axial spacing of said peripheral portions of said bearing means substantially equal to the axial distance between said shoulders, and means on the ends of said axle engaging the outer bearing means of each tilling unit and forcing the inner bearing means of each tilling unit toward the sides of said bar, such force being transmitted between the inner and outer bearing means of each tilling unit by the associated spacer sleeve thereby enabling said earth tilling units to be tightly clamped to said bar while preventing said peripheral portions of said bearing means from being forcibly urged against their associated shoulders.

GEORGE E. BEARD.

References Cited in the file of this patent

UNITED STATES PATENTS

| Number | Name | Date |
| --- | --- | --- |
| 800,256 | Wood | Sept. 26, 1905 |
| 1,843,028 | Kelso | Jan. 26, 1932 |
| 1,880,584 | Tibbitts | Oct. 4, 1932 |
| 1,965,575 | Clark | July 10, 1934 |